United States Patent
Vardi et al.

(10) Patent No.: US 11,892,943 B2
(45) Date of Patent: Feb. 6, 2024

(54) METHODS AND SYSTEMS FOR SYNCHRONIZING BEHAVIOR-DRIVEN DEVELOPMENT (BDD) SPECIFICATIONS AND RESULTS TO A SINGLE POINT OF TRUTH WHILE TREATING EACH SCENARIO IN THE SCRIPT AS A SEPARATE TEST

(71) Applicant: MICRO FOCUS LLC, Santa Clara, CA (US)

(72) Inventors: Sharon Vardi, Yehud (IL); Yael Peisachov, Yehud (IL); Yuval Koren, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 17 days.

(21) Appl. No.: 17/191,225

(22) Filed: Mar. 3, 2021

(65) Prior Publication Data
US 2022/0283931 A1 Sep. 8, 2022

(51) Int. Cl.
G06F 11/36 (2006.01)

(52) U.S. Cl.
CPC ...... *G06F 11/3688* (2013.01); *G06F 11/3684* (2013.01); *G06F 11/3692* (2013.01); *G06F 11/3696* (2013.01)

(58) Field of Classification Search
CPC ............ G06F 11/3688; G06F 11/3694; G06F 11/3692; G06F 11/3696
See application file for complete search history.

(56) References Cited

U.S. PATENT DOCUMENTS

| | | | | |
|---|---|---|---|---|
| 6,502,102 B1* | 12/2002 | Haswell | ............... | G06F 11/3664 707/999.102 |
| 8,578,336 B1* | 11/2013 | Wiradarma | ......... | G06F 11/3684 717/125 |
| 2007/0083631 A1* | 4/2007 | Maccaux | ............ | G06F 11/3688 714/E11.207 |
| 2010/0100871 A1* | 4/2010 | Celeskey | ............ | G06F 11/3688 717/124 |
| 2012/0254665 A1* | 10/2012 | Pasala | ................. | G06F 11/3684 714/33 |
| 2012/0272206 A1* | 10/2012 | Sengupta | ............ | G06F 11/3684 717/101 |
| 2013/0132777 A1* | 5/2013 | Froehlich | ............ | G06F 11/3688 714/E11.178 |

(Continued)

*Primary Examiner* — Wei Y Zhen
*Assistant Examiner* — Brahim Bourzik
(74) *Attorney, Agent, or Firm* — Sheridan Ross P.C.

(57) ABSTRACT

Embodiments of the disclosure provide systems and methods for managing a lifecycle of a software application. According to one embodiment, software application lifecycle management can comprise receiving a specification for an application. The specification can comprise an executable script defining a plurality of features for the application and a plurality of scenarios. Each scenario representing a test for one or more features of the application and each feature comprising one or more user stories. A test entity can be created for and corresponding to each scenario in the specification and each scenario can be marked with a test identifier linking the created test entity to the corresponding scenario in the script. Results of execution of one or more scenarios of the plurality of scenarios can be received and reported on a per-feature and per-scenario basis.

18 Claims, 5 Drawing Sheets

(56) References Cited

U.S. PATENT DOCUMENTS

| | | | |
|---|---|---|---|
| 2013/0185056 A1* | 7/2013 | Ingram | G06F 11/3684 |
| | | | 704/9 |
| 2017/0091086 A1* | 3/2017 | Davis | G06F 11/3688 |
| 2017/0220458 A1* | 8/2017 | Finger | G06F 11/3688 |
| 2018/0239692 A1* | 8/2018 | Kalyanasundram | G06F 11/273 |
| 2019/0179732 A1* | 6/2019 | Venkatasubramanian | |
| | | | G06F 11/3664 |

* cited by examiner

METHODS AND SYSTEMS FOR SYNCHRONIZING BEHAVIOR-DRIVEN DEVELOPMENT (BDD) SPECIFICATIONS AND RESULTS TO A SINGLE POINT OF TRUTH WHILE TREATING EACH SCENARIO IN THE SCRIPT AS A SEPARATE TEST

FIELD OF THE DISCLOSURE

Embodiments of the present disclosure relate generally to methods and systems for managing a lifecycle of a software application and more particularly to synchronizing a development specification for the application to results of a test of that application.

BACKGROUND

Behavior Driven Development (BDD) is a software practice using an executable specification of an application under development. The scripts are readable by anyone and are used as the one source of truth for all stakeholders, e.g., product managers, product owners, developers, testers, automation engineers, etc. The script typically consists of many different test scenarios and each of these scenarios is covering different user stories. Previous approaches consider the whole script with all its scenarios as a single test and the test results were reported as the result of the whole script but not to individual scenarios. This causes inaccuracies. Once a single scenario within a script fails, the entire script is indicated as failed while in reality there could have been only a single test failure on a less important user story in that feature. Hence, there is a need for improved methods and systems for synchronizing a development specification for the application to results of a test of that application.

BRIEF SUMMARY

Embodiments of the disclosure provide systems and methods for managing a lifecycle of a software application. According to one embodiment, a method for software application lifecycle management can comprise receiving, by an Application Lifecycle Management (ALM) system, a Behavior Driven Development (BDD) specification for an application. The BDD specification can comprise an executable script defining a plurality of features for the application and a plurality of scenarios. Each scenario representing a test for one or more features of the plurality of features of the application and each feature comprising one or more user stories. A test entity can be created for and corresponding to each scenario of the plurality of scenarios in the BDD specification and each scenario of the plurality of scenarios in the BDD specification can be marked with a test IDentifier (ID) linking the created test entity to the corresponding scenario in the BDD script. Results of execution of one or more scenarios of the plurality of scenarios can be received and reported on a per-feature and per-scenario basis. The received results of execution of the plurality of scenarios can be synchronized with the BDD specification.

Reporting the received results of the execution of the one or more scenarios of the plurality of scenarios can comprise parsing the received results into sets of results for each test entity corresponding to the one or more scenarios. In some cases, reporting the received results of the execution of the one or more scenarios of the plurality of scenarios can further comprise determining whether the script defining at least one scenario of the one or more scenarios was changed prior to execution of the at least one scenario and in response to determining the script defining the at least one scenario was changed prior to execution of the at least one scenario, marking the script defining the least one scenario as needing an approval. Additionally, or alternatively, reporting the received results of the execution of the one or more scenarios of the plurality of scenarios can comprise determining whether an executed version of the script defining at least one scenario of the one or more scenarios is a latest version of the script defining the at least one scenario and in response to determining the executed version of the script defining the at least one scenario is not the latest version of the script defining the at least one scenario, marking the script defining the least one scenario as needing an update. Reporting the received results of the execution of the one or more scenarios of the plurality of scenarios can additionally, or alternatively, comprise determining an automation status for execution of each scenario of the one or more scenarios and the BDD specification and marking each scenario of the one or more scenarios and the BDD specification with the determined automation status. Additionally, or alternatively, reporting the received results of the execution of the one or more scenarios of the plurality of scenarios can comprise determining whether the script defining at least one scenario of the one or more scenarios comprises a new script and in response to determining the script defining the at least one scenario of the one or more scenarios comprises a new script, creating a new test entity for the at least one scenario and associating the received results for the at least one scenario with the new test entity.

According to another embodiment, a system can comprise a processor and a memory coupled with and readable by the processor. The memory can store therein a set of instructions which, when executed by the processor, causes the processor to manage a software application lifecycle by receiving a Behavior Driven Development (BDD) specification for an application. The BDD specification can comprise an executable script defining a plurality of features for the application and a plurality of scenarios. Each scenario can represent a test for one or more features of the plurality of features of the application and each feature can comprise one or more user stories. A test entity can be created for and corresponding to each scenario of the plurality of scenarios in the BDD specification. Each scenario of the plurality of scenarios in the BDD specification can be marked with a test IDentifier (ID) linking the created test entity to the corresponding scenario in the BDD script. Results of execution of one or more scenarios of the plurality of scenarios can be received and reported on a per-feature and per-scenario basis. The received results of execution of the plurality of scenarios can be synchronized with the BDD specification.

Reporting the received results of the execution of the one or more scenarios of the plurality of scenarios can comprise parsing the received results into sets of results for each test entity corresponding to the one or more scenarios. In some cases, reporting the received results of the execution of the one or more scenarios of the plurality of scenarios can further comprise determining whether the script defining at least one scenario of the one or more scenarios was changed prior to execution of the at least one scenario and in response to determining the script defining the at least one scenario was changed prior to execution of the at least one scenario, marking the script defining the least one scenario as needing an approval. Additionally, or alternatively, reporting the received results of the execution of the one or more scenarios of the plurality of scenarios can comprise determining whether an executed version of the script defining at least one scenario of the one or more scenarios is a latest version of the script defining the at least one scenario and in response to determining the executed version of the script defining the at least one scenario is not the latest version of the script defining the at least one scenario, marking the script defining the least one scenario as needing an update. Reporting the received results of the execution of the one or more scenarios of the plurality of scenarios can additionally, or alternatively, comprise determining an automation status for execution of each scenario of the one or more scenarios the BDD specification and marking each scenario of the one or more scenarios and the BDD specification with the determined automation status. Additionally, or alternatively, reporting the received results of the execution of the one or more scenarios of the plurality of scenarios can comprise determining whether the script defining at least one scenario of the one or more scenarios comprises a new script and in response to determining the script defining the at least one scenario of the one or more scenarios comprises a new script, creating a new test entity for the at least one scenario and associating the received results for the at least one scenario with the new test entity.

According to yet another embodiment, a non-transitory, computer-readable medium can comprise a set of instructions stored therein which, when executed by a processor, causes the processor to manage a software application lifecycle by receiving a Behavior Driven Development (BDD) specification for an application. The BDD specification can comprise an executable script defining a plurality of features for the application and a plurality of scenarios. Each scenario can represent a test for one or more features of the plurality of features of the application and each feature can comprise one or more user stories. A test entity can be created for and corresponding to each scenario of the plurality of scenarios in the BDD specification. Each scenario of the plurality of scenarios in the BDD specification can be marked with a test IDentifier (ID) linking the created test entity to the corresponding scenario in the BDD script. Results of execution of one or more scenarios of the plurality of scenarios can be received and reported on a per-feature and per-scenario basis. The received results of execution of the plurality of scenarios can be synchronized with the BDD specification.

Reporting the received results of the execution of the one or more scenarios of the plurality of scenarios can comprise parsing the received results into sets of results for each test entity corresponding to the one or more scenarios. In some cases, reporting the received results of the execution of the one or more scenarios of the plurality of scenarios can further comprise determining whether the script defining at least one scenario of the one or more scenarios was changed prior to execution of the at least one scenario and in response to determining the script defining the at least one scenario was changed prior to execution of the at least one scenario, marking the script defining the least one scenario as needing an approval. Additionally, or alternatively, reporting the received results of the execution of the one or more scenarios of the plurality of scenarios can comprise determining whether an executed version of the script defining at least one scenario of the one or more scenarios is a latest version of the script defining the at least one scenario and in response to determining the executed version of the script defining the at least one scenario is not the latest version of the script defining the at least one scenario, marking the script defining the least one scenario as needing an update. Reporting the received results of the execution of the one or more scenarios of the plurality of scenarios can additionally, or alternatively, comprise determining an automation status for execution of each scenario of the one or more scenarios and the BDD specification and marking each scenario of the one or more scenarios and the BDD specification with the determined automation status. Additionally, or alternatively, reporting the received results of the execution of the one or more scenarios of the plurality of scenarios can comprise determining whether the script defining at least one scenario of the one or more scenarios comprises a new script and in response to determining the script defining the at least one scenario of the one or more scenarios comprises a new script, creating a new test entity for the at least one scenario and associating the received results for the at least one scenario with the new test entity.

Figure 1:
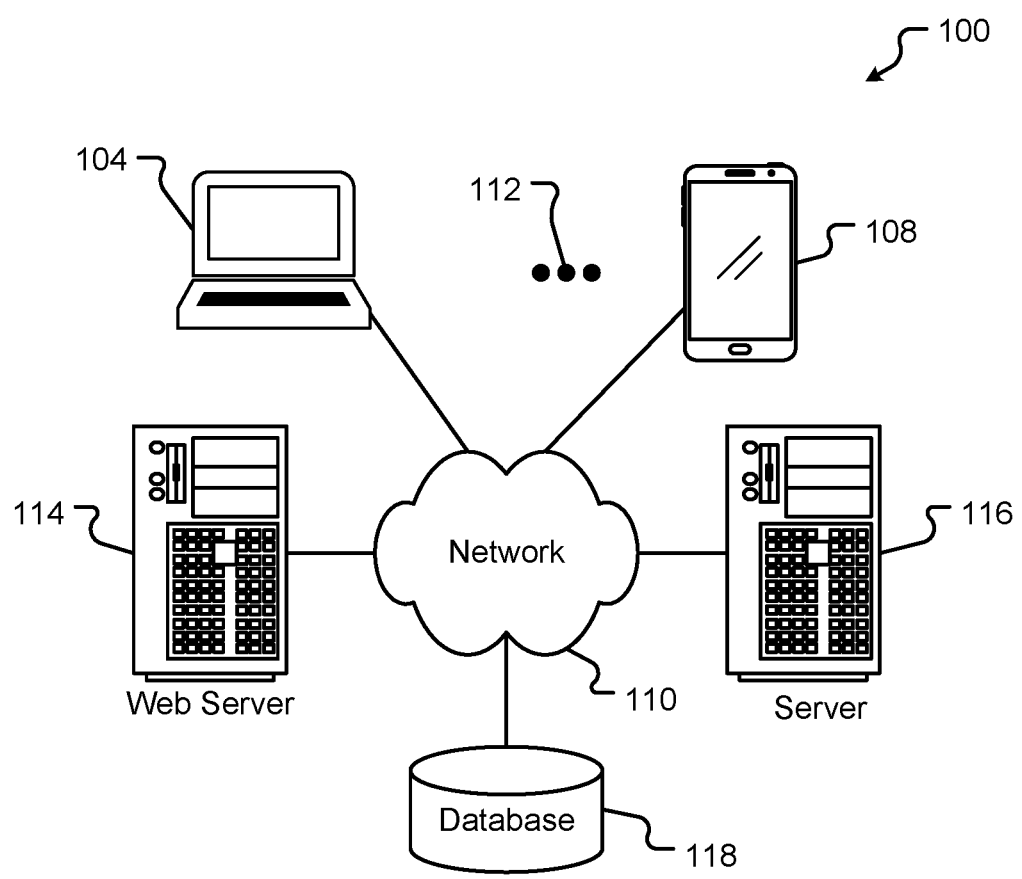
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure)

(HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
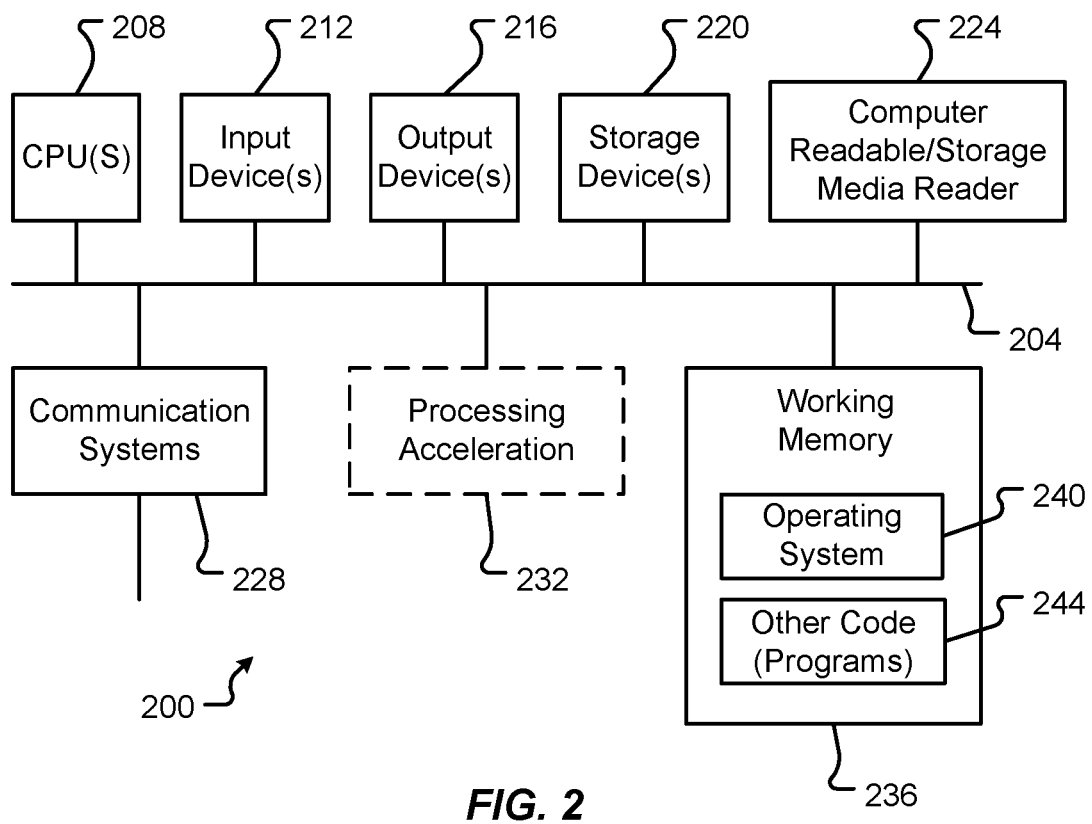
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
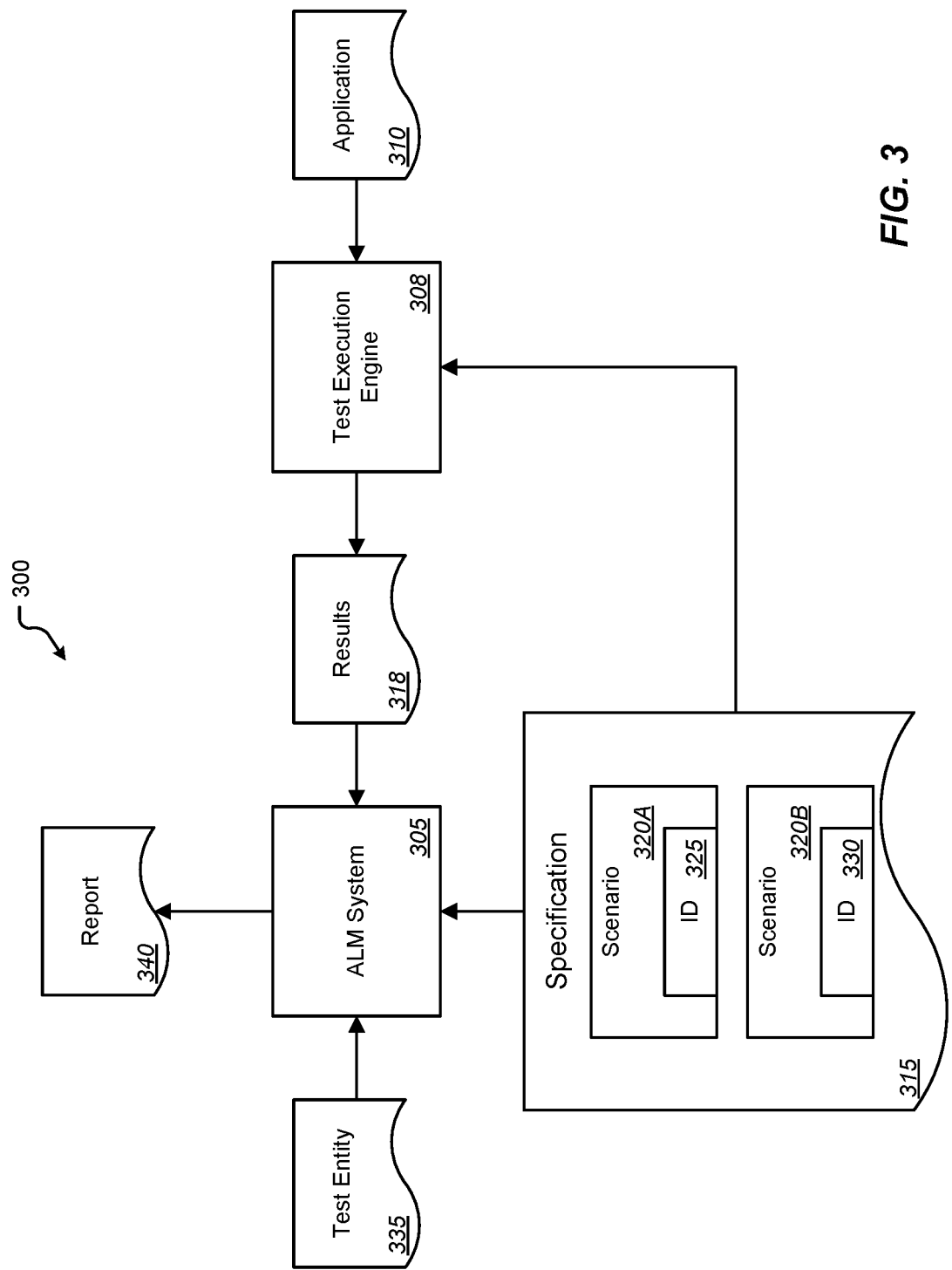
FIG. 3 is a block diagram illustrating elements of an exemplary application lifecycle management system according to one embodiment of the present disclosure.

FIG. 3 is a block diagram illustrating elements of an exemplary application lifecycle management system according to one embodiment of the present disclosure. As illustrated in this example, an environment 300 as may be implemented on any one or more of the servers or other computing systems described above can include an Application Lifecycle Management (ALM) system 305. The environment 300 can also comprise a test execution engine 308 adapted to execute one or more tests on an application 310 according to a specification 315 for the application. For example, the specification 315 can comprises a Behavior Driven Development (BDD) specification. Such a specification can comprise an executable script written in a language such as Gherkin syntax, that enables execution by the test execution engine 308, e.g., using the Cucumber library. The specification 315 can comprise a number of scenarios 320A and 320B. The scenarios 320A and 320B can each define one or more tests, such as functional tests of one or more features of the application 310 for example, executed on the application 310 by the test execution engine 305 through a user interface (not shown here) of the application 310. Such functional tests can further comprise one or more user stories as known in the art. Upon execution of one or more of the scenarios 320A and 320B, the test execution engine 305 can provide results 318 which the ALM system 305 can use to generate a report 340 as will be described below.

According to embodiments described herein, the ALM system 305 can be adapted to synchronize the specification 315 for the application 310 to results 318 of a test of the application 310. More specifically, the ALM system 305 can receive the specification 315 for the application 310 and analyze the specification 315 to identify each scenario 320A and 320B and user story for each feature of the application 310. The ALM system 305 can then create a test entity 335 for and corresponding to each scenario 320A and 320B of the plurality of scenarios in the specification. Each scenario 320A and 320B in the specification 315 can be marked with a test IDentifier (ID) 325 and 330. The test ID 325 and 330 can link the created test entity 335 to the corresponding scenario 320A and 320B in the script of the specification 315.

The script of the specification 315 can be executed by the test execution engine 308 thereby performing one or more of the scenarios 320A and 320B in the specification 315 and results 318 of execution of one or more scenarios 320A and 320B can be received or determined by the ALM system 305. The received results of the execution of the one or more scenarios 320A and 320B can then be provided by the ALM system 305, e.g., in the results report 340, on a per-feature and per-scenario basis. Reporting on a per-feature and/or per-scenario basis can comprise providing indications of whether the script for the feature or scenario has changed since the last execution, whether the script for the feature or scenario executed by the test execution engine 305 is the latest version of that script, whether the script executed by the test execution engine 305 is a new script, and/or an automation status of the test executed by the test execution engine 305. Additional details of an exemplary process for reporting 430 the results will be described below with reference to FIG. 5. Additionally, or alternatively, the ALM system 305 can synchronize the received results of execution of the scenarios 320A and 320B with the specification 315.

Figure 4:
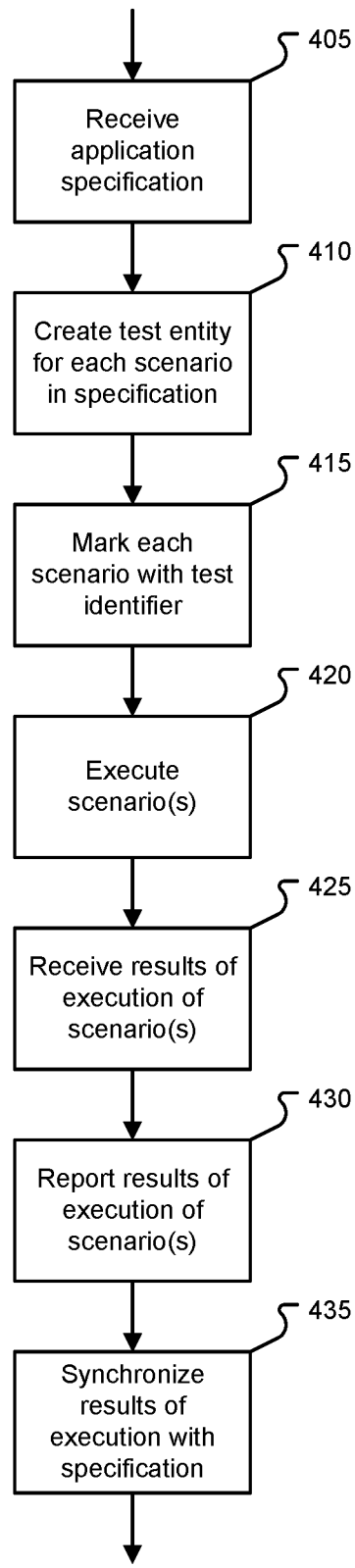
FIG. 4 is a flowchart illustrating an exemplary process for managing an application lifecycle according to one embodiment of the present disclosure.

FIG. 4 is a flowchart illustrating an exemplary process for managing an application lifecycle according to one embodiment of the present disclosure. As illustrated in this example, software application lifecycle management can comprise receiving 405, by an ALM system 300 as described above, a specification for an application, such as a BDD specification, for example. The specification can comprise an executable script defining a plurality of features for the application and a plurality of scenarios. Each scenario can represent a test for one or more features of the plurality of features of the application and each feature can comprise one or more user stories. A test entity can be created 410 for and corresponding to each scenario of the plurality of scenarios in the specification. Each scenario of the plurality of scenarios in the specification can be marked 415 with a test IDentifier (ID). The test ID can link the created test entity to the corresponding scenario in the script.

The script can be executed 420, thereby performing one or more of the scenarios in the specification and results of execution of one or more scenarios of the plurality of scenarios can be received 425. The received results of the execution of the one or more scenarios of the plurality of scenarios can then be reported 430 on a per-feature and per-scenario basis. Additional details of an exemplary process for reporting 430 the results will be described below with reference to FIG. 5. Additionally, or alternatively, the received results of execution of the plurality of scenarios can be synchronized 435 with the specification. For example, the results can be synchronized to the specification by an identifier on the specification level. Then, the individual scenario results can be synchronized to a corresponding test by the testID.

Figure 5:
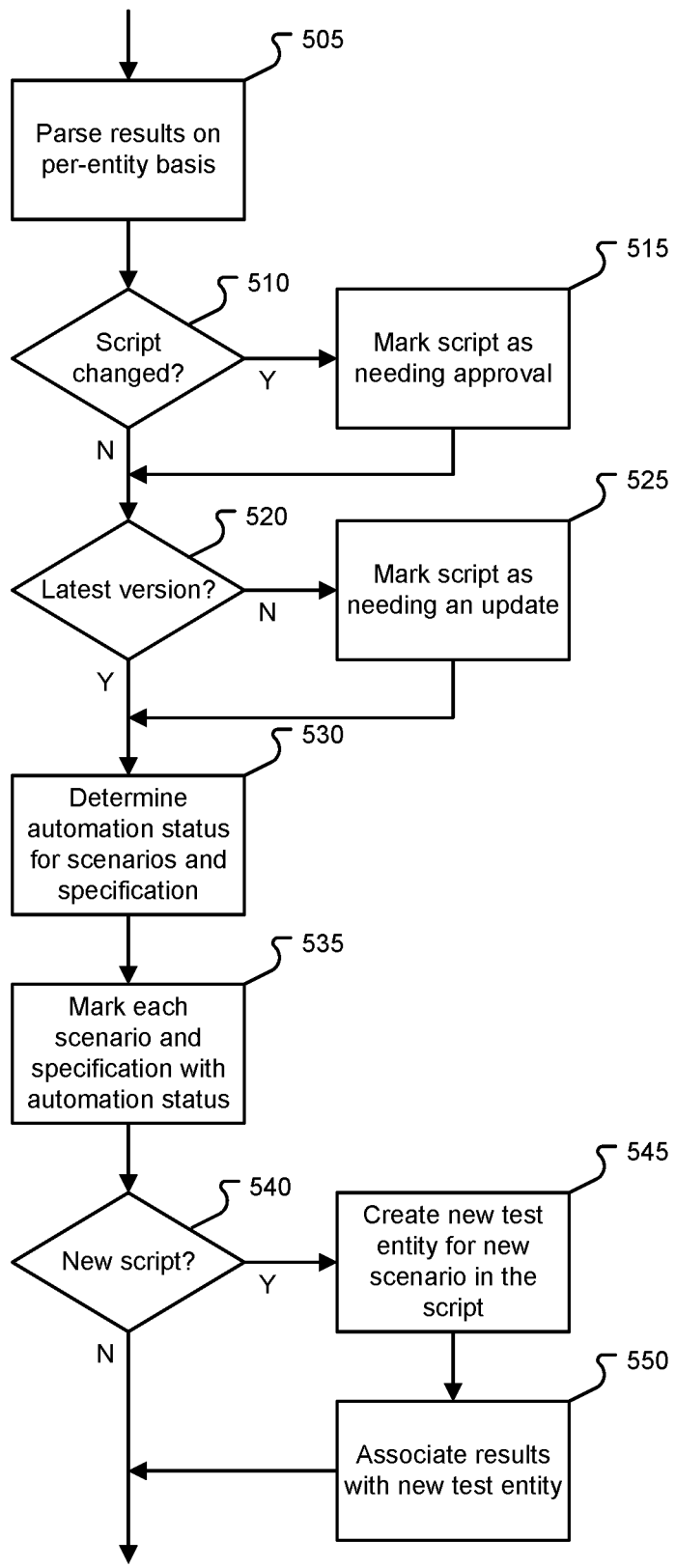
FIG. 5 is a flowchart illustrating additional details of an exemplary process for reporting scenario execution according to one embodiment of the present disclosure.

FIG. 5 is a flowchart illustrating additional details of an exemplary process for reporting scenario execution according to one embodiment of the present disclosure. Reporting scenario execution can be accomplished using a number of different processes as described here. Any one or more of these processes can be performed individually or together and in any order, not only in the order described here. As illustrated in this example, reporting the received results of the execution of the one or more scenarios of the plurality of scenarios can comprise parsing 505 the received results into sets of results with one set for each test entity corresponding to the one or more scenarios. In some cases, reporting the received results of the execution of the one or more scenarios of the plurality of scenarios can further comprise determining 510 whether the script defining at least one scenario of the one or more scenarios was changed prior to execution of the at least one scenario. In response to determining 510 the script defining the at least one scenario was changed prior to execution of the at least one scenario, the script defining the least one scenario can be marked 515 as needing an approval.

Additionally, or alternatively, reporting the received results of the execution of the one or more scenarios of the plurality of scenarios can comprise determining 520 whether an executed version of the script defining at least one scenario of the one or more scenarios is a latest version of the script defining the at least one scenario. In response to determining 520 the executed version of the script defining the at least one scenario is not the latest version of the script defining the at least one scenario, the script defining the least one scenario can be marked 525 as needing an update.

Reporting the received results of the execution of the one or more scenarios of the plurality of scenarios can additionally, or alternatively, comprise determining 530 an automation status for execution of each scenario of the one or more scenarios and the specification. The automation status of each scenario can be either automated or not automated, i.e., manually performed. The automation status can comprise one of not automated, i.e., a manually performed test scenario, fully automated, i.e., test scenario automatically performed by the script, or partially automated, i.e., a combination of manually and automatically performed test scenarios. Each scenario of the one or more scenarios and the specification can be marked 535 with the determined automation status.

Additionally, or alternatively, reporting the received results of the execution of the one or more scenarios of the plurality of scenarios can comprise determining 540 whether the script defining at least one scenario of the one or more scenarios comprises a new script. In response to determining 540 the script defining the at least one scenario of the one or more scenarios comprises a new script, a new test entity can be created 545 for the at least one scenario. The received results for the at least one scenario can then be associated 550 with the new test entity.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for software application lifecycle management, the method comprising:

receiving, by an Application Lifecycle Management (ALM) system, a Behavior Driven Development (BDD) specification for an application, the BDD specification comprising an executable script defining a plurality of features for the application and a plurality of scenarios, each scenario representing a test for one or more features of the plurality of features of the application, and each feature comprising one or more user stories;

creating, by the ALM system, a test entity for and corresponding to each scenario of the plurality of scenarios in the BDD specification;

marking, by the ALM system, each scenario of the plurality of scenarios in the BDD specification with a test IDentifier (ID), the test ID linking the created test entity to the corresponding scenario of the plurality of scenarios in the BDD executable script;

receiving, by the ALM system, results of execution of one or more scenarios of the plurality of scenarios;

reporting, by the ALM system, the received results of the execution of the one or more scenarios of the plurality of scenarios on a per-feature and per-scenario basis, wherein reporting the received execution results comprises marking each scenario within the executable script of the BDD specification to indicate an action related to each scenario of the executable script and an automation status of each scenario of the executable script based on the received results of execution of the one or more scenarios, the automation status of each scenario indicating whether the scenario was executed automatically or manually; and synchronizing, by the ALM system, the received results of execution of the plurality of scenarios with the BDD specification.

2. The method of claim 1, wherein reporting the received results of the execution of the one or more scenarios of the plurality of scenarios comprises parsing the received execution results into sets of results for each test entity corresponding to the one or more scenarios of the plurality of scenarios.

3. The method of claim 2, wherein reporting the received results of the execution of the one or more scenarios of the plurality of scenarios further comprises:

determining whether the executable script defining at least one scenario of the one or more scenarios was changed prior to execution of the at least one scenario; and in response to determining the executable script defining the at least one scenario was changed prior to execution of the at least one scenario, marking the executable script defining the least one scenario as needing an approval.

4. The method of claim 2, wherein reporting the received results of the execution of the one or more scenarios of the plurality of scenarios further comprises:

determining whether an executed version of the executable script defining at least one scenario of the one or more scenarios is a latest version of the executable script defining the at least one scenario; and in response to determining the executed version of the executable script defining the at least one scenario is not the latest version of the executable script defining the at least one scenario, marking the executable script defining the least one scenario as needing an update.

5. The method of claim 2, wherein reporting the received results of the execution of the one or more scenarios of the plurality of scenarios further comprises:

determining the automation status for execution of each scenario of the one or more scenarios in the BDD specification; and marking each scenario of the one or more scenarios in the BDD specification with the determined automation status.

6. The method of claim 2, wherein reporting the received results of the execution of the one or more scenarios of the plurality of scenarios further comprises:
determining whether the executable script defining at least one scenario of the one or more scenarios comprises a new script; and
in response to determining the executable script defining the at least one scenario of the one or more scenarios comprises a new script, creating a new test entity for the at least one scenario and associating the received execution results for the at least one scenario with the new test entity.

7. A system comprising:
a processor; and
a memory coupled with and readable by the processor and storing therein a set of instructions which, when executed by the processor, causes the processor to manage a software application lifecycle by:
receiving a Behavior Driven Development (BDD) specification for an application, the BDD specification comprising an executable script defining a plurality of features for the application and a plurality of scenarios, each scenario representing a test for one or more features of the plurality of features of the application, and each feature comprising one or more user stories;
creating a test entity for and corresponding to each scenario of the plurality of scenarios in the BDD specification;
marking each scenario of the plurality of scenarios in the BDD specification with a test IDentifier (ID), the test ID linking the created test entity to the corresponding scenario of the plurality of scenarios in the BDD executable script;
receiving results of execution of one or more scenarios of the plurality of scenarios;
reporting the received results of the execution of the one or more scenarios of the plurality of scenarios on a per-feature and per-scenario basis, wherein reporting the received execution results comprises marking each scenario within the executable script of the BDD specification to indicate an action related to each scenario of the executable script and an automation status of each scenario of the executable script based on the received results of execution of the one or more scenarios, the automation status of each scenario indicating whether the scenario was executed automatically or manually; and
synchronizing the received results of execution of the plurality of scenarios with the BDD specification.

8. The system of claim 7, wherein reporting the received results of the execution of the one or more scenarios of the plurality of scenarios comprises parsing the received execution results into sets of results for each test entity corresponding to the one or more scenarios of the plurality of scenarios.

9. The system of claim 8, wherein reporting the received results of the execution of the one or more scenarios of the plurality of scenarios further comprises:
determining whether the executable script defining at least one scenario of the one or more scenarios of the plurality of scenarios was changed prior to execution of the at least one scenario; and
in response to determining the executable script defining the at least one scenario was changed prior to execution of the at least one scenario, marking the executable script defining the least one scenario as needing an approval.

10. The system of claim 8, wherein reporting the received results of the execution of the one or more scenarios of the plurality of scenarios further comprises:
determining whether an executed version of the script defining at least one scenario of the one or more scenarios of the plurality of scenarios is a latest version of the executable script defining the at least one scenario; and
in response to determining the executed version of the executable script defining the at least one scenario is not the latest version of the executable script defining the at least one scenario, marking the executable script defining the least one scenario as needing an update.

11. The system of claim 8, wherein reporting the received results of the execution of the one or more scenarios of the plurality of scenarios further comprises:
determining the automation status for execution of each scenario of the one or more scenarios in the BDD specification; and marking each scenario of the one or more scenarios in the BDD specification with the determined automation status.

12. The system of claim 8, wherein reporting the received results of the execution of the one or more scenarios of the plurality of scenarios further comprises:
determining whether the script defining at least one scenario of the one or more scenarios of the plurality of scenarios comprises a new script; and
in response to determining the executable script defining the at least one scenario of the one or more scenarios of the plurality of scenarios comprises a new script, creating a new test entity for the at least one scenario and associating the received execution results for the at least one scenario with the new test entity.

13. A non-transitory, computer-readable medium comprising a set of instructions stored therein which, when executed by a processor, causes the processor to manage a software application lifecycle by:
receiving a Behavior Driven Development (BDD) specification for an application, the BDD specification comprising an executable script defining a plurality of features for the application and a plurality of scenarios, each scenario representing a test for one or more features of the plurality of features of the application, and each feature comprising one or more user stories;
creating a test entity for and corresponding to each scenario of the plurality of scenarios in the BDD specification;
marking each scenario of the plurality of scenarios in the BDD specification with a test IDentifier (ID), the test ID linking the created test entity to the corresponding scenario of the plurality of scenarios in the BDD executable script;
receiving results of execution of one or more scenarios of the plurality of scenarios;
reporting the received results of the execution of the one or more scenarios of the plurality of scenarios on a per-feature and per-scenario basis, wherein reporting the received execution results comprises marking each scenario within the executable script of the BDD specification to indicate an action related to each scenario of the executable script and an automation status of each scenario of the executable script based on the received results of execution of the one or more scenarios, the automation status of each scenario indicating whether the scenario was executed automatically or manually; and synchronizing the received results of execution of the plurality of scenarios with the BDD specification.

14. The non-transitory, computer-readable medium of claim 13, wherein reporting the received results of the execution of the one or more scenarios of the plurality of scenarios comprises parsing the received execution results into sets of results for each test entity corresponding to the one or more scenarios of the plurality of scenarios.

15. The non-transitory, computer-readable medium of claim 13, wherein reporting the received results of the execution of the one or more scenarios of the plurality of scenarios further comprises:

determining whether the script defining at least one scenario of the one or more scenarios of the plurality of scenarios was changed prior to execution of the at least one scenario; and in response to determining the executable script defining the at least one scenario was changed prior to execution of the at least one scenario, marking the executable script defining the least one scenario as needing an approval.

16. The non-transitory, computer-readable medium of claim 13, wherein reporting the received results of the execution of the one or more scenarios of the plurality of scenarios further comprises:

determining whether an executed version of the script defining at least one scenario of the one or more scenarios of the plurality of scenarios is a latest version of the executable script defining the at least one scenario; and in response to determining the executed version of the executable script defining the at least one scenario is not the latest version of the executable script defining the at least one scenario, marking the executable script defining the least one scenario as needing an update.

17. The non-transitory, computer-readable medium of claim 13, wherein reporting the received results of the execution of the one or more scenarios of the plurality of scenarios further comprises:

determining the automation status for execution of each scenario of the one or more scenarios in the BDD specification; and marking each scenario of the one or more scenarios in the BDD specification with the determined automation status.

18. The non-transitory, computer-readable medium of claim 13, wherein reporting the received results of the execution of the one or more scenarios of the plurality of scenarios further comprises:

determining whether the script defining at least one scenario of the one or more scenarios of the plurality of scenarios comprises a new script; and in response to determining the executable script defining the at least one scenario of the one or more scenarios of the plurality of scenarios comprises a new script, creating a new test entity for the at least one scenario and associating the received execution results for the at least one scenario with the new test entity.

* * * * *